United States Patent [19]
Woods

[11] 4,257,501
[45] Mar. 24, 1981

[54] TEMPERATURE RESPONSIVE FAN CLUTCH FOR VEHICLE ENGINE

[75] Inventor: Robert L. Woods, Fort Worth, Tex.

[73] Assignee: Eaglemotive Industries, Inc., Fort Worth, Tex.

[21] Appl. No.: 23,833

[22] Filed: Mar. 26, 1979

[51] Int. Cl.3 .............................................. F16D 35/00
[52] U.S. Cl. ................................. 192/58 C; 192/82 T
[58] Field of Search .......................... 123/41.12, 41.46; 192/58 C, 82 T

[56] References Cited

U.S. PATENT DOCUMENTS

| | | | |
|---|---|---|---|
| 2,879,755 | 3/1959 | Weir | 192/82 T |
| 3,019,875 | 2/1962 | Fowler | 192/58 C |
| 3,580,229 | 5/1971 | May | 123/41.12 |
| 3,739,891 | 6/1973 | LaFlame | 192/82 T |
| 4,036,339 | 7/1977 | Kikuchi | 192/82 T |

FOREIGN PATENT DOCUMENTS

| | | | |
|---|---|---|---|
| 1284721 | 12/1968 | Fed. Rep. of Germany | 192/58 C |

*Primary Examiner*—Lawrence J. Staab
*Attorney, Agent, or Firm*—Wm. T. Wofford

[57] ABSTRACT

A temperature responsive clutch which engages the radiator cooling fan of a motor vehicle engine when the engine temperature is sufficiently high. The clutch comprises a housing rotatably mounted on a shaft which is adapted to be attached to the fan mounting of the engine. The housing has means for mounting a fan and comprises front and rear housing plates attached together to form an enclosed chamber for holding a viscous fluid. A rear inner plate is fixedly attached to the shaft within the chamber. A front inner plate located within the chamber is slideably mounted on pins extending from the front housing plate to allow the front inner plate and the housing to rotate together and to allow the front inner plate to move axially. The legs of a U-shaped member extend through apertures formed through the front inner plate and are attached to the front housing plate. A spring carried within the U-shaped member engages the center portion of the front inner plate on its rear side for urging it away from the rear inner plate. A temperature responsive member supported by the front housing plate engages and moves the front inner plate toward and close to the rear inner plate when the temperature increases for causing the front inner plate and hence the housing and fan to be rotatably driven by the force of the viscous fluid between the front and rear inner plates.

6 Claims, 4 Drawing Figures

43
75
43
35
81
75
75
41
53
49
77
39

27
29
33
31
23
25
35
36
73
73
93
79
61
69
71
63
65
91
51
95
47

97
27

27
36
47
31
51
49
53
33
35
41
25
39
65
61
89
61A
85
83
87
67
61B
29
37
39
37
43
45
21

21

TEMPERATURE RESPONSIVE FAN CLUTCH FOR VEHICLE ENGINE

BACKGROUND OF THE INVENTION

1. Field of the Invention

The present invention relates to a temperature responsive clutch for a radiator cooling fan of a motor vehicle engine.

2. Description of the Prior Art

In a conventional motor vehicle, the radiator cooling fan is driven constantly by way of pulleys and belts from the crank shaft of the engine. In order to increase engine efficiency, it has been found desirable to drive the cooling fan only when the temperature of the engine reaches a high level. This may be done by providing a fan clutch which is controlled by a temperature sensing element that allows the fan to rotate freely if engine temperature is low and which engages the fan with engine rotation if the temperature is high.

U.S. Pat. Nos. 3,227,254 and 2,838,244 disclose temperature responsive clutches for driving a radiator cooling fan when the temperature is high. The clutches of these patents are of the viscous fluid drive type.

SUMMARY OF THE INVENTION

It is an object of the present invention to provide a unique and improved temperature responsive viscous fluid drive clutch for the radiator cooling fan of a vehicle engine.

It is another object of the present invention to provide a temperature responsive viscous fluid drive clutch for a radiator cooling fan which is simple in structure and is easily adaptable to existing motor vehicles.

DESCRIPTION OF THE PREFERRED EMBODIMENT

Figures 1, 2:
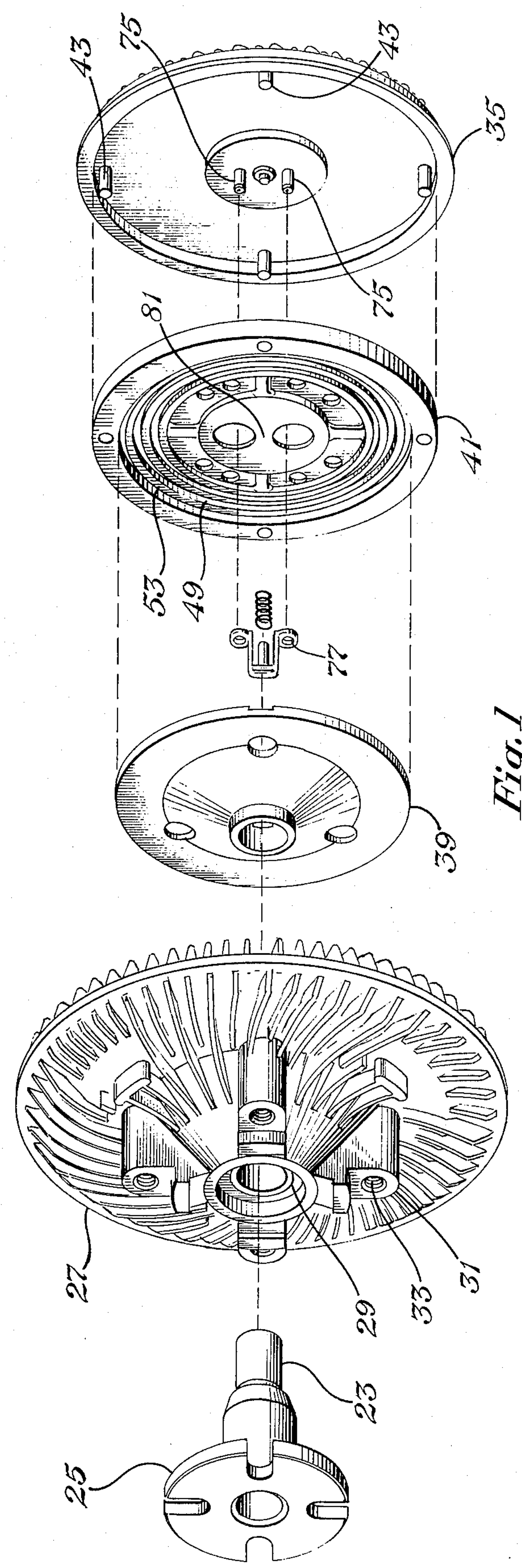
FIG. 1 is an exploded view of the clutch of the present invention as seen from its rear side.
FIG. 2 is an exploded view of the clutch of FIG. 1 as seen from its front side.

Referring now to the drawings, the clutch of the present invention is identified by reference numeral 21. It comprises a shaft 23 having a flange 25 adapted to be bolted to an existing fan mounting of a vehicle engine. Reference is made to U.S. Pat. No. 3,924,585 for a disclosure of the shaft of a fan clutch bolted to the existing fan mounting of a vehicle engine. A rear housing member or plate 27 is rotatably mounted to the shaft 23 by an annular bearing member 29. The rear side of plate 27 has four mounting members 31 with threaded apertures 33 for mounting a radiator cooling fan (not shown). A front housing plate 35 has its peripheral edge 36 secured in a fluid tight seal to the rear housing plate 27 forming a housing having a sealed chamber 37 for holding a viscous fluid (not shown) such as a silicone fluid. A rear inner plate 39 is fixedly attached to the end of the shaft 21 within chamber 37. Attachment is by way of a press fit. A front inner plate 41 is located in the chamber 37 and is coupled to the front housing plate 35 in a manner to allow plates 41 and 35 to rotate together and to allow plate 41 to move axially relative to the front housing plate 35 and the rear inner plate 39. Coupling is by way of a simple arrangement comprising four pins 43 integral with the front plate 35 and four apertures 45 formed through the front inner plate 41 for slidingly receiving the pins 43.

Figures 3, 4:
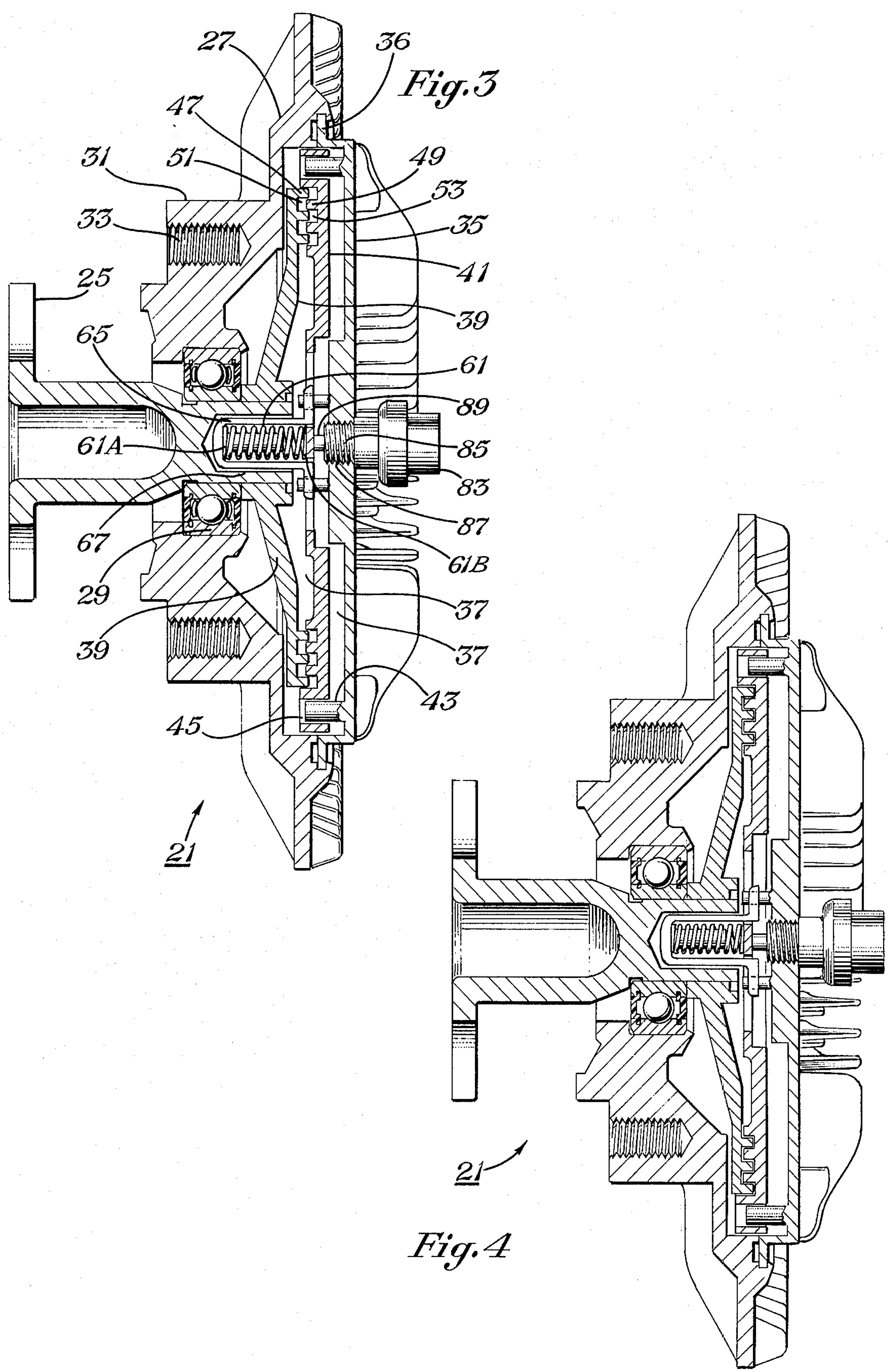
FIG. 3 is a cross sectional view of the assembled clutch of FIGS. 1 and 2 with it thermostat in a cold condition whereby the cooling fan is disengaged.
FIG. 4 is a cross sectional view of the assembled clutch of FIGS. 1 and 2 with the thermostat in a heated condition whereby the cooling fan is engaged for cooling purposes.

A plurality of spaced apart annular concentric lands 47 are formed on the front side of rear inner plate 39 and a plurality of spaced apart annular concentric lands 49 are formed on the rear side of front inner plate 41. The lands 47 and 49 are formed and disposed such that the grooves 51 between lands 47 may receive lands 49 and the grooves 53 between lands 49 may receive lands 47 when the front inner plate 41 is moved toward and close to the rear inner plate 39, as shown in FIG. 4.

Front inner plate 41 is urged away from rear inner plate 39 by a spring 61. The spring has one end 61A seated against the inside of the central portion 63 of a U-shaped member 65 which is located in an aperture 67 formed in the front end of shaft 21. A central rod 69 extends from the central portion 63 of the U-shaped member 65 for holding the spring 61 between the legs 71 of the U-shaped member 65. The legs 71 extend through two apertures 73 respectively formed through the front inner plate 41 and are fixedly connected to the front housing plate 35 by way of pins 75 which are integral with plate 35. The pins 75 extend through aperture 77 formed through transverse end portions 79. Pins 75 have their ends swedged (not shown) to the end portions 79 for fixedly connecting the legs 71 of the U-shaped member 65 to the front housing plate 35. As shown, apertures 73 are formed through the front inner plate 41 at positions equally spaced apart from the axis of plate 41 leaving a center portion 81. The other end 61B of the spring 61 is seated against the center portion 81 of front inner plate 41 and urges plate 41 away from the rear inner plate 39, as shown in FIG. 3. With this arrangement for supporting the spring 61, neither the spring 61 or the U-shaped member 65 engages the shaft 23 or the rear inner plate 39, thereby eliminating friction between these members as the shaft 23 and plate 39 turn relative to plate 41 and the housing formed by plates 27 and 35.

A thermostat 83 has an end 85 threaded into aperture 87 formed through the front housing plate 35. The thermostat 83 has a moveable element 89 located in the chamber 37. When the temperature is low, element 89 assumes a retracted position as shown in FIG. 3 thereby allowing spring 61 to urge the plate 41 away from plate 39 and, hence, lands 49 away from lands 47. In the retracted position, there is a slight clearance (not shown) between the end of element 89 and the front side of center portion 81 of plate 41. When the temperature increases due to engine heat (typically to about 160° F.), the thermostat causes its element 89 to move to an extended position (to the left as shown in FIG. 4) to engage the center portion 81 of plate 41 and to move the plate 41 toward and close to plate 39 (against the bias of spring 61) whereby the lands 49 of plate 41 are located in the grooves 51 of plate 39 and the lands 47 of plate 39 are located in the grooves 53 of plate 41. This is illustrated in FIG. 4.

When the shaft 23 is attached to the existing fan mounting of a motor vehicle, the shaft 23 and, hence, inner rear plate 39 will be driven by the engine by way of pulleys and belts (not shown) from the crank shaft of the engine. When the engine is cool, element 89 of thermostat 83 will be in its retracted position and the front inner plate 41 will be biased away from the rear inner plate 39 by the spring 61.

Under these conditions, the viscous fluid in chamber 37 does not act to transmit enough power or torque from plate 39 to plate 41 to cause the plate 41 and, hence, the housing and fan to be rotatably driven by the front inner plate 41. Thus, the housing and, hence, the fan are disengaged although they are free to rotate on bearing member 29.

As the engine temperature increases beyond a given value, dependent upon the characteristics of the thermostat, the thermostat element 89 is moved to its extended position causing plate 41 to move close to plate 39, as shown in FIG. 4. Under these conditions, the viscous fluid in chamber 37 acts to transmit enough torque from plate 39 to plate 41 by shear force to cause plate 41 and, hence, the housing and fan to be rotatably driven. Thus, the fan is engaged for cooling purposes.

The amount of viscous fluid in the chamber 37 is less than its total volume. Apertures 91 and 93 are formed through plates 39 and 41 respectively to allow the viscous fluid to flow between these plates. Radial slots 95 are formed in lands 47 to allow the viscous fluid to be rapidly distributed in the grooves 51 and 53 between lands 47 and 49. The radial slots 95 may be formed in lands 49 instead of in lands 47. Front housing plates 27 and 35 are secured together by locating the edge 36 of plate 35 within the annular lip 97 (see FIG. 2) of plate 27 and folding the lip 97 over the edge 36, as shown in FIGS. 3 and 4. After the plates 27 and 35 have been secured together with the inner plates 39 and 41 located in place, the viscous fluid may be inserted within the chamber 37 through aperture 87 before the thermostat is threaded in place.

What is claimed is:

1. A temperature responsive clutch for the radiator cooling fan of a motor vehicle engine, comprising:

a shaft to be attached to the fan mounting of said engine, a housing rotatably mounted on said shaft by bearing means, said housing having means for mounting a fan, said housing comprising a front housing plate and a rear housing plate attached together to form an enclosed chamber for holding a viscous fluid, a rear inner plate fixedly attached to said shaft within said chamber, a front inner plate located in said chamber and coupled to said front housing plate for rotation there with and for axial movement relative to said front housing plate and said rear inner plate, said front inner plate having spaced apart apertures formed therethrough at positions spaced from the axis thereof, a spring mounting member having legs extending through said apertures and connected to said front housing plate, and further having inside structure between said legs, spring means located between the legs of said spring mounting member and having one end in engagement with the inside structure of said spring mounting member and the other end in engagement with the rear side of the center portion of said front inner plate betwen said apertures for urging said front inner plate away from said rear inner plate, and temperature responsive means supported by said front housing plate and having a moveable element located within said chamber for engaging and moving said front inner plate toward said rear inner plate when the temperature increases to a high level whereby said front inner plate and, hence, said housing are rotated due to the shear force of said viscous fluid between said rear and front inner plates.

2. The temperature responsive clutch of claim 1 wherein said spring mounting means is located out of engagement of said shaft and said rear inner plate.

3. The temperature responsive clutch of claim 1 comprising:

an aperture formed in the front end of said shaft, said spring mounting means being located within said aperture out of engagement of the structure of said shaft.

4. The temperature responsive clutch of claim 1 comprising:

a plurality of spaced apart pins formed on the rear side of said front housing plate, and a plurality of spaced apart apertures formed in said front inner plate for slidingly receiving said pins for coupling said front inner plate to said front housing plate for rotation therewith and for allowing said front inner plate to move axially relative to said front housing plate and said rear inner plate.

5. The temperature responsive clutch of claim 1 wherein:

said bearing means is located between said rear housing plate and said shaft, said means for mounting a fan is formed on said rear housing plate.

6. A temperature responsive clutch for the radiator cooling fan of a motor vehicle engine, comprising:

a shaft to be attached to the fan mounting of said engine, a housing rotatably mounted on said shaft by bearing means, said housing having means for mounting a fan, said housing comprising a front housing plate and a rear housing plate attached together to form an enclosed chamber for holding a viscous fluid, a rear inner plate fixedly attached to said shaft within said chamber, a front inner plate located in said chamber and coupled to said front housing plate for rotation there with and for axial movement relative to said front housing plate and said rear inner plate, said front inner plate having aperture means formed therethrough and spaced from the axis thereof, a spring mounting member having support structure extending through said aperture means and connected to said front housing plate, and further having inside structure, spring means having one end in engagement with the inside structure of said spring mounting member and the other end in engagement with the rear side of the center portion of said front inner plate for urging said front inner plate away from said rear inner plate, and temperature responsive means supported by said front housing plate and having a moveable element located within said chamber for engaging and moving said front inner plate toward said rear inner plate when the temperature increases to a high level whereby said front inner plate and, hence, said housing are rotated due to the shear force of said viscous fluid between said rear and front inner plates.

* * * * *